G. D. MUNSING.
TRACTOR CONNECTION.
APPLICATION FILED AUG. 13, 1912.

1,078,801.

Patented Nov. 18, 1913.

3 SHEETS—SHEET 2.

WITNESSES

INVENTOR
George D. Munsing
by Henry Orth Jr. Attorney

G. D. MUNSING.
TRACTOR CONNECTION.
APPLICATION FILED AUG. 13, 1912.

1,078,801.

Patented Nov. 18, 1913.

3 SHEETS—SHEET 3.

WITNESSES
T. L. Cochran
E. Leckert.

INVENTOR
George D. Munsing
by Henry Orth Jr. Attorney

UNITED STATES PATENT OFFICE.

GEORGE D. MUNSING, OF NEW YORK, N. Y., ASSIGNOR TO GEORGE D. MUNSING AND CHARLES E. INGERSOLL, OF NEW YORK, N. Y., A COPARTNERSHIP DOING BUSINESS AS MUNSING AND INGERSOLL.

TRACTOR CONNECTION.

1,078,801.  Specification of Letters Patent.  Patented Nov. 18, 1913.

Application filed August 13, 1912. Serial No. 714,317.

*To all whom it may concern:*

Be it known that I, GEORGE D. MUNSING, a citizen of the United States of America, residing at New York city, in the county and State of New York, have invented certain new and useful Improvements in Tractor Connections; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to tractor connections, that is to say, to that mechanism connecting a tractor, customarily a three wheeled motor vehicle, with the wagon or other vehicle to be drawn thereby.

At present some tractors are connected to the vehicle to be drawn at two points, the object being to prevent the tractor from doubling up on the vehicle or close like a jack knife when backing, it being understood that the front or caster wheel of the tractor is mounted to rotate about a vertical axis.

By the present invention the front wheels of the vehicle are removed and the front end of the vehicle body rests directly on and is supported by the connecting mechanism forming the subject matter of this invention, located preferably, but not necessarily over the rear axle of the tractor.

The connecting mechanism between tractor and vehicle must be such as to allow the front end of the vehicle to have universal movement to a certain extent and at the same time permit the rotation of the tractor about the center of connection, and at the same time means must be provided to frictionally retard the turning of the tractor with respect to the vehicle at its point of connection. It is not possible to use a positive locking means for the rotating element of this connection for the reason that sudden jolts and jars are apt to break the parts so locked.

Figure 1:
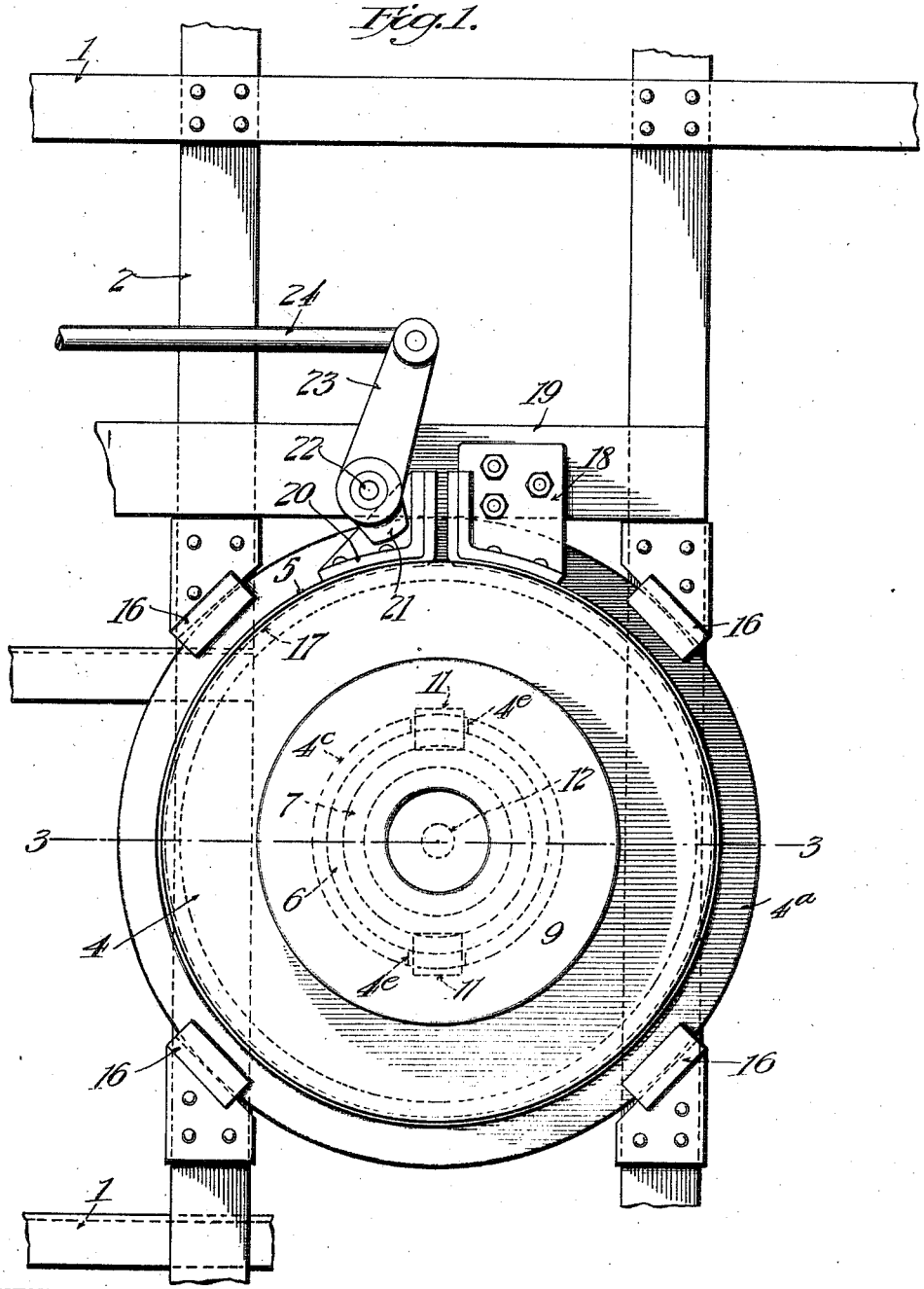
Figure 2:
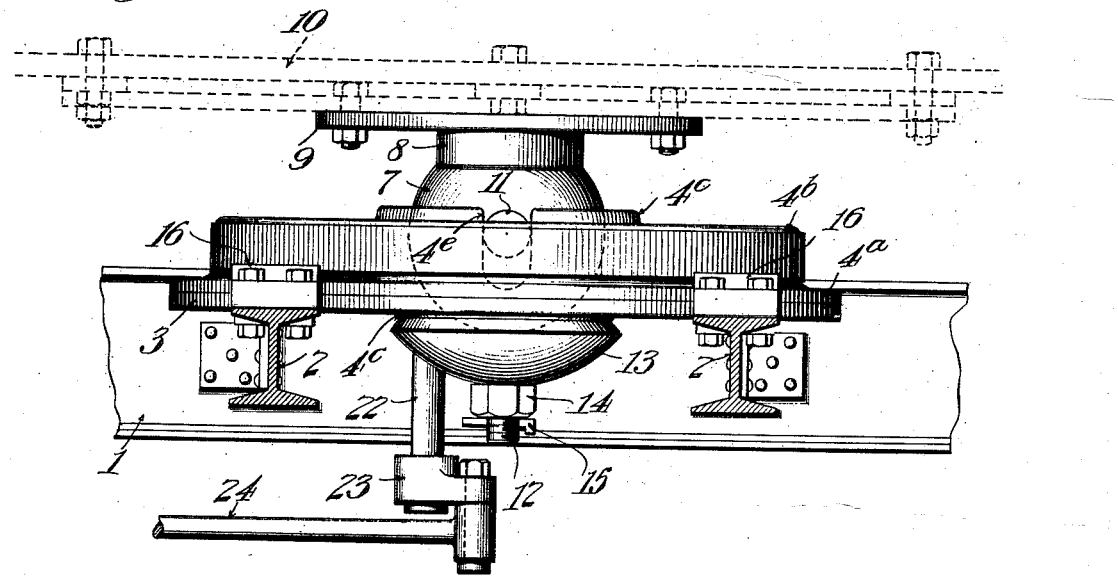
Figure 3:
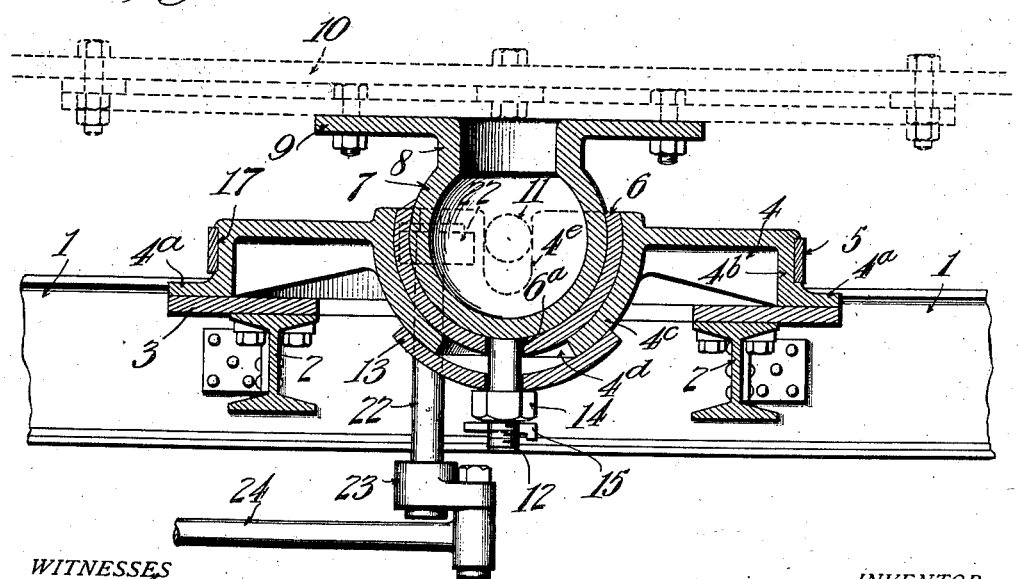
Figure 4:
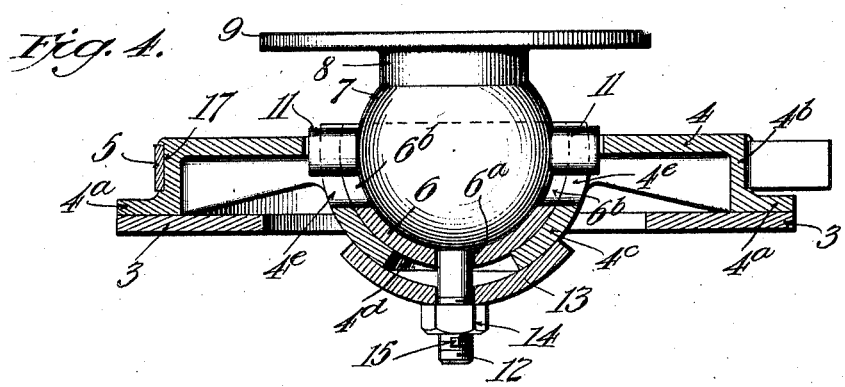
Figure 5:
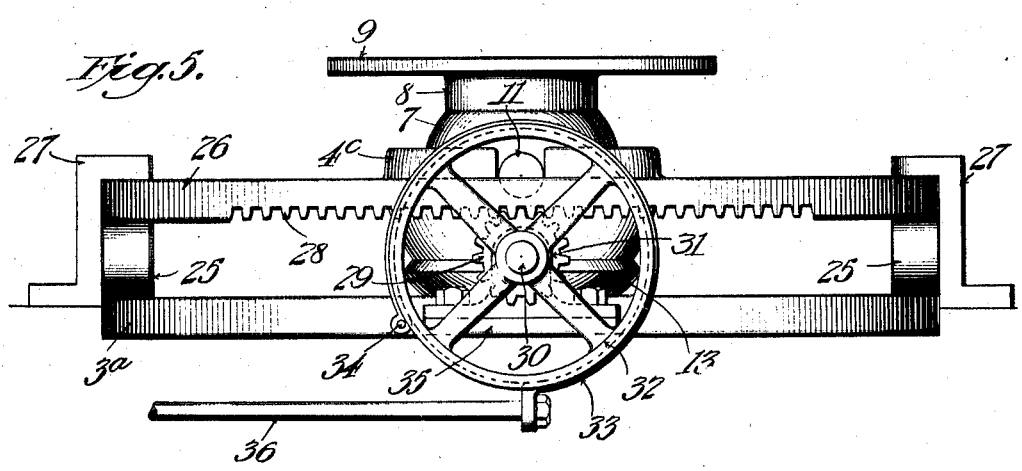
Figure 6:
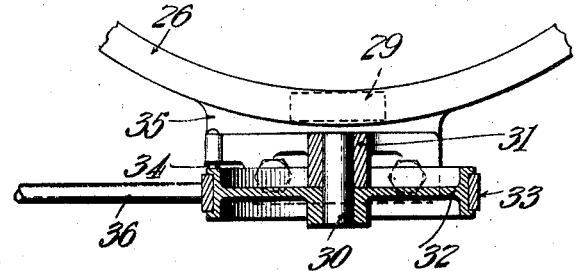

Referring to the drawings in which like parts are similarly designated: Figure 1 is a plan view of the tractor connection embodying my invention. Fig. 2 is a side elevation thereof. Fig. 3 is a vertical section taken on the line 3—3 of Fig. 1. Fig. 4 is a section taken substantially at right angles to Fig. 3. Fig. 5 is a modification shown in elevation, and Fig. 6 is a partial horizontal section thereof.

Referring to Figs. 1, 2, 3, and 4, between the longitudinal members 1 of the chassis of the tractor are the cross members 2 suitably connected thereto. These members are either structural shapes or built up of such shapes, however, it is immaterial how the chassis is made so long as it is provided with supports equivalent to the cross members 2 for supporting the structure forming the subject matter of this invention.

Resting on the transverse supports 2 and bolted or otherwise secured thereto is a ring 3. Resting on this ring is a casting 4 having a base or circular portion $4^a$ for engaging the ring 3 and a cylindrical portion $4^b$ engaged by a friction brake 5 and having a central spherical portion $4^c$ provided with a central perforation or circular opening $4^d$ and lateral slots $4^e$ that extend downward below the horizontal diameter of the spherical portion $4^c$. Within the spherical portion $4^c$ is spherical bushing 6 having a central perforation $6^a$ arranged to register with the perforation $4^d$ and also having lateral slots $6^b$ arranged to register with the slots $4^e$.

Within the bushing 6 is placed a spherical bearing 7 preferably, but not necessarily hollow, connected by a neck 8 to flange 9, which is bolted or otherwise suitably secured to the front portion of the bottom 10 of a vehicle to be connected to the tractor. The spherical bearing 7 is provided with diametrically opposite pins 11, said pins lying in the slots $4^e$ and a vertically depending king bolt 12, which king bolt passes through the perforation $6^a$ in a bushing and through a larger perforation or circular opening $4^d$ in the bearing $4^c$ and carries a spherical washer 13, held in place on the king bolt 12 and against the spherical portion $4^c$ by a nut 14 and a cotter 15 or any other equivalent device.

It will be noted that the perforation $4^d$ is quite large in diameter compared to the perforation $6^a$, the object being to allow the spherical bearing 7 together with the bushing 6, washer 13 and king bolt 12, to swing at a relatively larger angle in any direction. The slots $4^e$ permit the lateral lugs 11 on the bearing 7 to swing to a comparatively large angle and thereby afford a universal connection between the body of the vehicle and the frame of the tractor.

The casting 4 is held in place relatively to the ring 3 by suitable brackets 16 (Figs. 1 and 2) bolted or otherwise secured to the cross members 2, and whose ends project over the ring 4ª. The cylindrical portion 4ᵇ in the casting 4 is preferably provided with a groove 17 for the reception of a brake band 5 and prevents the band from slipping off. This brake has one end secured to a stationary bracket 18 secured to a suitable support 19 on the chassis, and here shown as a member extending transversely across the members 2. The movable end of the brake band has connected to it a wear piece 20 engaged by cam 21, on a vertical shaft 22, on whose lower end is a lever 23 pivotally connected to a rod 24. This rod 24 is connected in any well known manner to a hand or foot lever (not shown) at the forward end of the tractor and within reach of the operator. By exerting a pull on the rod 24, the casting 4 will be frictionally held against rotation on the ring 3 and thus permit the backing of the vehicle and tractor without undue injury to any of the frictionally held parts by reason of the rear tractor wheels falling into a hole or rut during the backing operation, the friction being not sufficiently strong to hold the casting 4 against any movement whatever, it being understood that when exceptional force is exerted by the tractor, the casting 4 will slip sufficiently to prevent any breakage, while under ordinary conditions the friction is sufficient when the tractor has been turned at the desired angle for backing, to hold the tractor and vehicle in proper relation.

In Figs. 5 and 6, I have shown a modification wherein the friction ring is formed as a roller race 3ª supporting a plurality of antifriction rollers 25 and on these rollers rests a ring 26 held in place by bracket 27. This ring carries the parts 4ᶜ and is provided with a spherical bearing 7, a neck 8 and a plate 9, as in the illustration heretofore described. The ring 26 is provided with a rack 28 extending 90° more or less over its circumference and this rack is engaged by pinion 29 mounted on a stub shaft 30 held in a bearing 31.

On the shaft 30 a brake wheel is provided with a brake band 33, one end of which is held stationary by a pin 34 mounted in a bracket 35 projecting from the ring 3ª. The free end of the brake band is connected to a rod 36 operated in any well known manner.

The universal connection between the vehicle and the tractor is assured by reason of the parts 4ᶜ, 7, 8, 9 and 11, etc., which are identical with those shown in Fig. 4, for example, but the ring 26 is frictionally held against rotation by frictionally holding the pinion 29, gearing with the rack 28, by applying pressure to the band 33 on the brake 32. Thus it will be seen that I provide interlocking mechanism in the rack 28 and pinion 29, and means to frictionally control the interlocking mechanism in the brake 32, 33.

I claim—

1. A connection mechanism between a vehicle and a tractor, comprising a stationary ring on the tractor, a ring rotatable with respect thereto, means connected to the vehicle and coöperating with the rotatable ring to permit universal movement, and friction brake mechanism to control the rotation of the latter ring.

2. A connection mechanism between a vehicle and a tractor, comprising a ring on the tractor, a casting having a bottom flange coöperating with the ring, a spherical socket on said casting having lateral slots extending below its horizontal diameter and a vertical central opening, a spherical bearing connected to the vehicle having lateral diametrical lugs arranged to lie in said slots, a bolt passing through the opening, a spherical washer on the bolt to cover the opening and brake mechanism to control the rotation of the casting.

3. A connection mechanism between a vehicle and a tractor, comprising a ring secured to the tractor, a ring supported thereon and having a rack, a pinion arranged to gear with the rack and a brake to control the rotation of the pinion and rack.

4. A connection mechanism between a vehicle and a tractor, comprising a ring secured to the tractor, a rotatable ring coöperating therewith; rollers between the rings, brackets to hold the rotatable ring in operative position, said rotatable ring having a rack extending over a portion of its surface, a pinion projecting between the rings and gearing with the rack, a shaft on which said pinion is mounted, a brake wheel on said shaft, and a brake band coöperating with the wheel.

In testimony that I claim the foregoing as my invention, I have signed my name in presence of two subscribing witnesses.

GEORGE D. MUNSING.

Witnesses:
 JAMES H. WESTCOTT,
 THEODORE YOUNG.